United States Patent
Chang (10) Patent No.: US 9,526,375 B2
(45) Date of Patent: Dec. 27, 2016

(54) CONNECTING STRUCTURE FOR BARBECUE GRILL

(71) Applicants: REVOACE INC, Taichung (TW); Blue Rhino Global Sourcing, Inc., Winston-Salem, NC (US)

(72) Inventor: Shu-Jui Chang, Taichung (TW)

(73) Assignee: REVOACE INC., Taichung (TW)

( * ) Notice: Subject to any disclaimer, the term of this patent is extended or adjusted under 35 U.S.C. 154(b) by 0 days.

(21) Appl. No.: 15/086,067

(22) Filed: Mar. 31, 2016

(65) Prior Publication Data

US 2016/0206145 A1  Jul. 21, 2016

Related U.S. Application Data

(63) Continuation-in-part of application No. 14/598,223, filed on Jan. 16, 2015.

(51) Int. Cl.
*A47J 37/07* (2006.01)
*F16B 5/00* (2006.01)

(52) U.S. Cl.
CPC .............. *A47J 37/07* (2013.01); *F16B 5/0036* (2013.01)

(58) Field of Classification Search
CPC .... A47J 37/07; A47J 37/0704; A47J 37/0713; A47J 37/0786; A47B 57/50; F16B 12/50
See application file for complete search history.

(56) References Cited

U.S. PATENT DOCUMENTS

| | | | | |
|---|---|---|---|---|
| 3,273,720 A | * | 9/1966 | Seiz | A47B 57/402 108/107 |
| 4,718,399 A | * | 1/1988 | Shepherd | A47J 37/0786 126/25 R |
| 4,955,743 A | * | 9/1990 | King | A47B 57/50 211/192 |
| 5,072,718 A | * | 12/1991 | Seal | F16B 12/50 126/25 R |
| 5,277,106 A | * | 1/1994 | Raymer | A47J 37/0786 108/159 |
| 5,279,214 A | * | 1/1994 | Lamendola | A47J 37/0704 126/25 A |
| 5,452,707 A | * | 9/1995 | Harris | F16B 12/50 126/25 R |
| 5,623,866 A | * | 4/1997 | Home | A47J 37/0786 126/25 R |
| 5,791,331 A | * | 8/1998 | Stewart | A47J 37/0704 126/25 R |

(Continued)

*Primary Examiner* — Daniel Wiley (57) ABSTRACT

A connecting structure for a barbecue grill contains: a body and a holding mount. The holding mount includes a first side plate, a second side plate, a third side plate, a fourth side plate, and a pull bar. Each of the first and second side plates has a plurality of connecting elements, and each connecting element has a head portion and an extension, the third side plate has multiple first retaining slots, and the fourth side plate has multiple second retaining slots. Each first retaining slot has a first notch and a second notch, the pull bar has two positioning pieces which correspond to the first side plate and the second side plate, respectively. Each positioning piece has a connection groove which has a wide section and a narrow section, a diameter of which is less than the wide section and within the head portion and the extension.

5 Claims, 16 Drawing Sheets (56) References Cited

U.S. PATENT DOCUMENTS

| | | | | |
|---|---|---|---|---|
| 5,941,229 A * | 8/1999 | Schlosser | ............ | A47J 37/0713 |
| | | | | 126/25 R |
| 6,230,910 B1 * | 5/2001 | Olsson | ................... | A47B 57/50 |
| | | | | 211/192 |
| 6,257,229 B1 * | 7/2001 | Stewart | ............... | A47J 37/0786 |
| | | | | 126/276 |
| 6,494,419 B2 * | 12/2002 | Pai | ........................ | A45D 19/04 |
| | | | | 108/132 |
| 6,708,601 B2 * | 3/2004 | Home | .................... | A23B 4/052 |
| | | | | 126/25 R |
| 6,925,998 B2 * | 8/2005 | Bruno | ................. | A47J 37/0704 |
| | | | | 126/25 R |
| 6,978,722 B2 * | 12/2005 | Home | .................. | A47B 13/003 |
| | | | | 108/153.1 |
| 7,810,486 B2 * | 10/2010 | Bruno | ................. | A47J 37/0704 |
| | | | | 126/25 R |
| 9,241,566 B1 * | 1/2016 | Chen | ....................... | A47B 57/38 |
| 2004/0065312 A1 * | 4/2004 | Choi | .................... | A47J 37/0786 |
| | | | | 126/25 R |
| 2005/0279341 A1 * | 12/2005 | Chung | ................. | A47J 37/0704 |
| | | | | 126/9 R |
| 2007/0169768 A1 * | 7/2007 | Chung | ................. | A47J 37/0786 |
| | | | | 126/25 R |
| 2008/0224588 A1 * | 9/2008 | Pai | ...................... | A47J 37/0786 |
| | | | | 312/410 |
| 2008/0302747 A1 * | 12/2008 | Nance | .................... | A47B 57/50 |
| | | | | 211/183 |
| 2014/0053823 A1 * | 2/2014 | Frantz | ................. | A47J 37/0763 |
| | | | | 126/276 |

\* cited by examiner

CONNECTING STRUCTURE FOR BARBECUE GRILL

BACKGROUND OF THE INVENTION

Field of the Invention

This application is a Continuation-in-Part of application Ser. No. 14/598,223, filed on 16 Jan. 2015.

DESCRIPTION OF THE PRIOR ART

Conventional grill is employed to grill foods, such as meat, vegetables, and fishes, etc.

To barbecue easily and healthily, a barbecue grill is developed and contains a drilling device and a gas supply device below the drilling device.

However, the gas supply device has a large size and is not stored conveniently. Furthermore, it is manually connected and removed by using a hand toll troublesomely.

The present invention has arisen to mitigate and/or obviate the afore-described disadvantages.

SUMMARY OF THE INVENTION

The primary objective of the present invention is to provide a connecting structure for a barbecue grill which is assembled quickly and easily.

To obtain the above objective, a connecting structure for a barbecue grill provided by the present invention contains: a body and a holding mount.

The holding mount includes a first side plate, a second side plate, a third side plate, a fourth side plate, and a pull bar.

Each of the first side plate and the second side plate has a plurality of connecting elements fixed on two peripheral sides of a first surface thereof and two peripheral sides of a second surface thereof, respectively. Each connecting element has a head portion and an extension, a diameter of which is less than the head portion, the third side plate has multiple first retaining slots defined on two peripheral sides thereof, individually, and the fourth side plate has multiple second retaining slots formed on two peripheral sides thereof, individually. Each first retaining slot has a first notch defined on a bottom thereof so as to retain with said each connecting element, and each second retaining slot has a second notch defined on a bottom thereof so as to retain with said each connecting element.

The pull bar has two positioning pieces mounted on two peripheral sides thereof, respectively, and the two positioning pieces correspond to the first side plate and the second side plate, respectively.

Each positioning piece has a connection groove configured to connect with any two of the plurality of connecting elements, and the connection groove has a wide section and a narrow section communicating with the wide section, wherein a diameter of the wide section is more than the head portion of said each connecting element, and a diameter of the narrow section is within the head portion and the extension of said each connecting element.

DETAILED DESCRIPTION OF THE PREFERRED EMBODIMENTS

With reference to FIGS. 1 to 7, a connecting structure for a barbecue grill according to a preferred embodiment of the present invention is assembled quickly and easily. The connecting structure for the barbecue grill comprises: a body 1 and a holding mount 2.

The holding mount 2 includes a first side plate 21, a second side plate 22, a third side plate 23, a fourth side plate 24, and a pull bar 25.

Each of the first side plate 21 and the second side plate 22 has a plurality of connecting elements 3 fixed on two peripheral sides of a first surface thereof and two peripheral sides of a second surface thereof, respectively. Each connecting element 3 has a head portion 31 and an extension 32, a diameter of which is less than the head portion 31.

Figure 6:
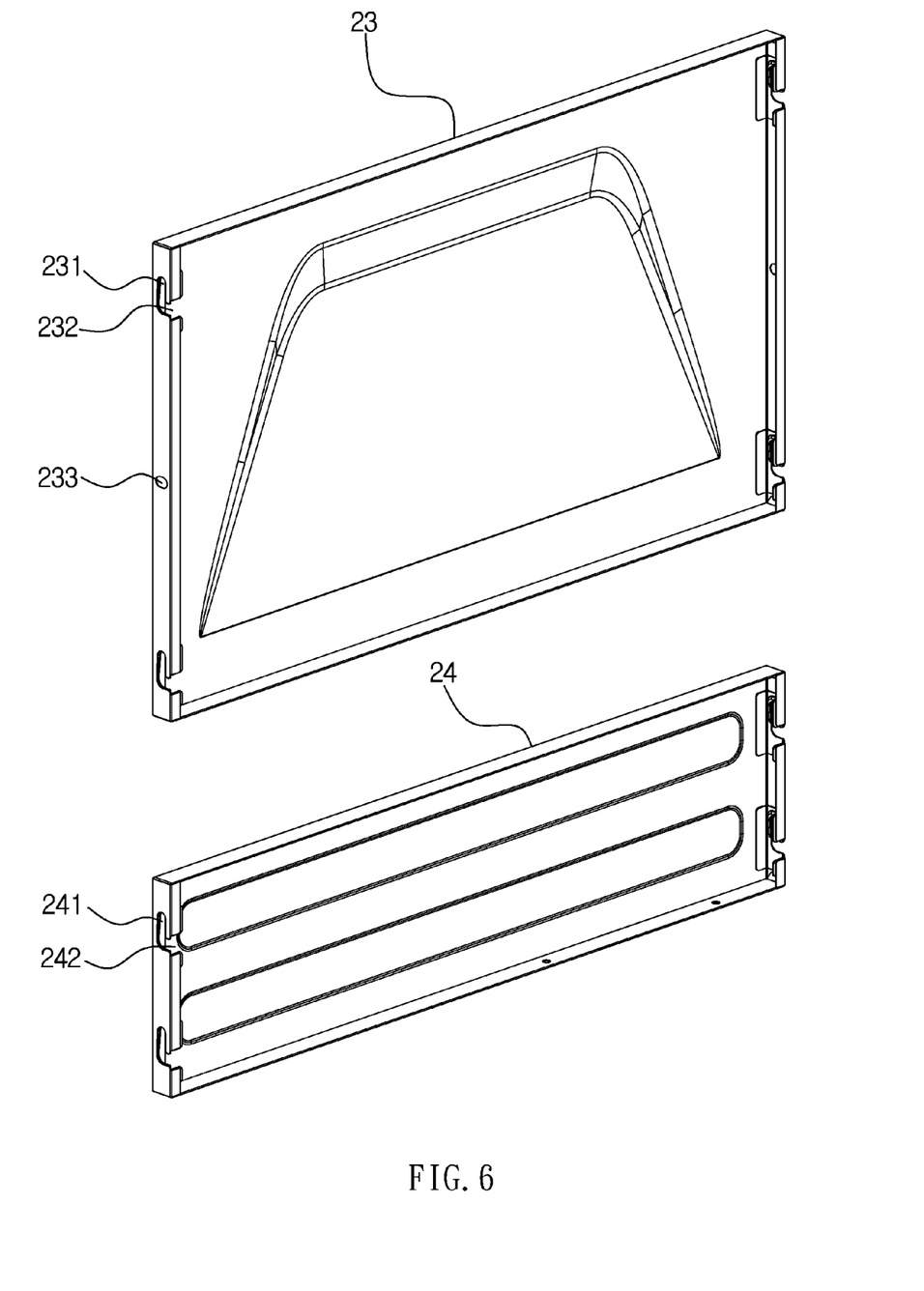
FIG. 6 is another perspective view showing the exploded components of a part of the connecting structure for the barbecue grill according to the preferred embodiment of the present invention.

The third side plate 23 has multiple first retaining slots 231 defined on two peripheral sides thereof, individually, and the fourth side plate 24 has multiple second retaining slots 241 formed on two peripheral sides thereof, individually (as shown in FIG. 6), wherein each first retaining slot 231 has a first notch 232 defined on a bottom thereof so as to retain with said each connecting element 3, and each second retaining slot 241 has a second notch 242 defined on a bottom thereof so as to retain with said each connecting element 3.

Figure 7:
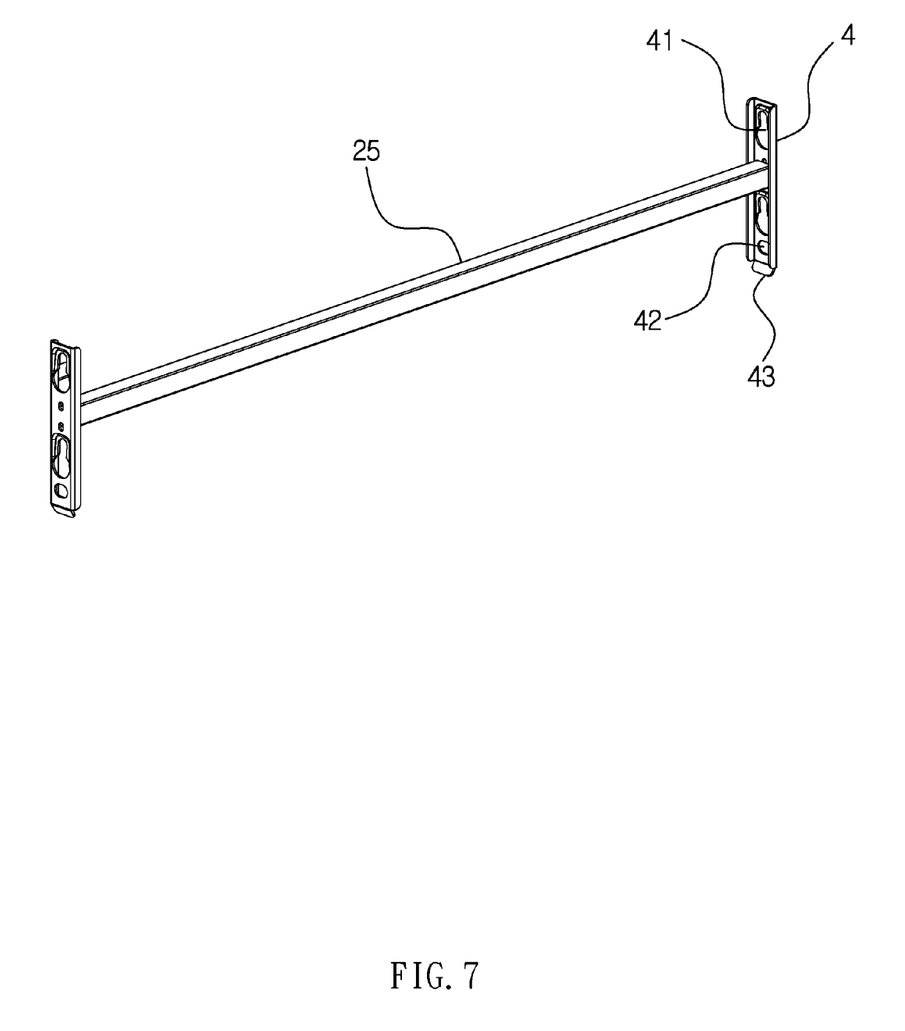
FIG. 7 is also another perspective view showing the exploded components of a part of the connecting structure for the barbecue grill according to the preferred embodiment of the present invention.

The pull bar 25 has two positioning pieces 4 mounted on two peripheral sides thereof, respectively, and the two positioning pieces 4 correspond to the first side plate 21 and the second side plate 22, respectively (as illustrated in FIG. 7). Each positioning piece 4 has a connection groove 41 configured to connect with any two of the plurality of connecting elements 3, and the connection groove 41 has a wide section 411 and a narrow section 412 communicating with the wide section 411, wherein a diameter of the wide section 411 is more than the head portion 31 of said each connecting element 3, and a diameter of the narrow section 412 is within the head portion 31 and the extension 32 of said each connecting element 3.

Figure 1:
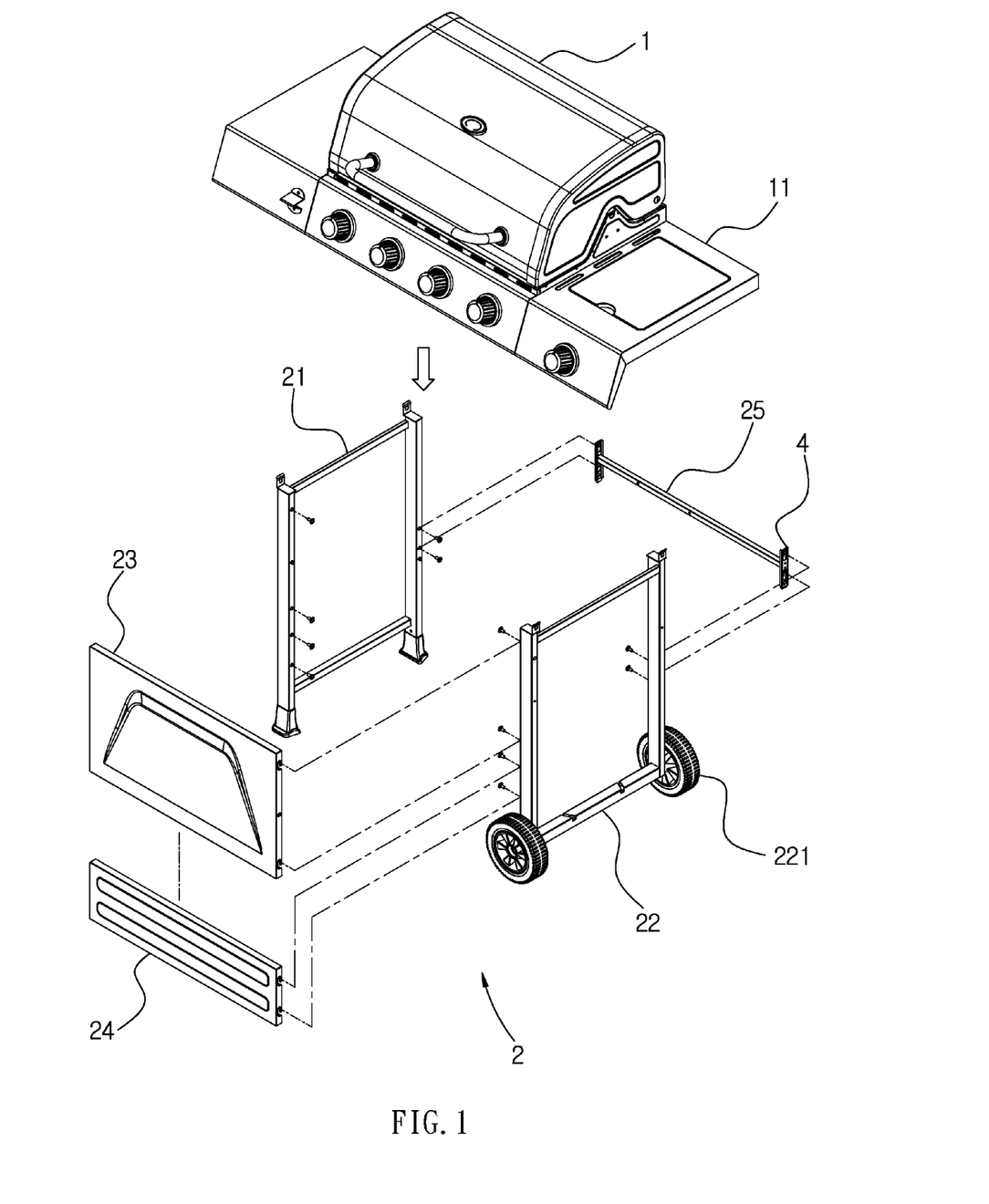
FIG. 1 is a perspective view showing the exploded components of a connecting structure for a barbecue grill according to a preferred embodiment of the present invention.
Figure 2:
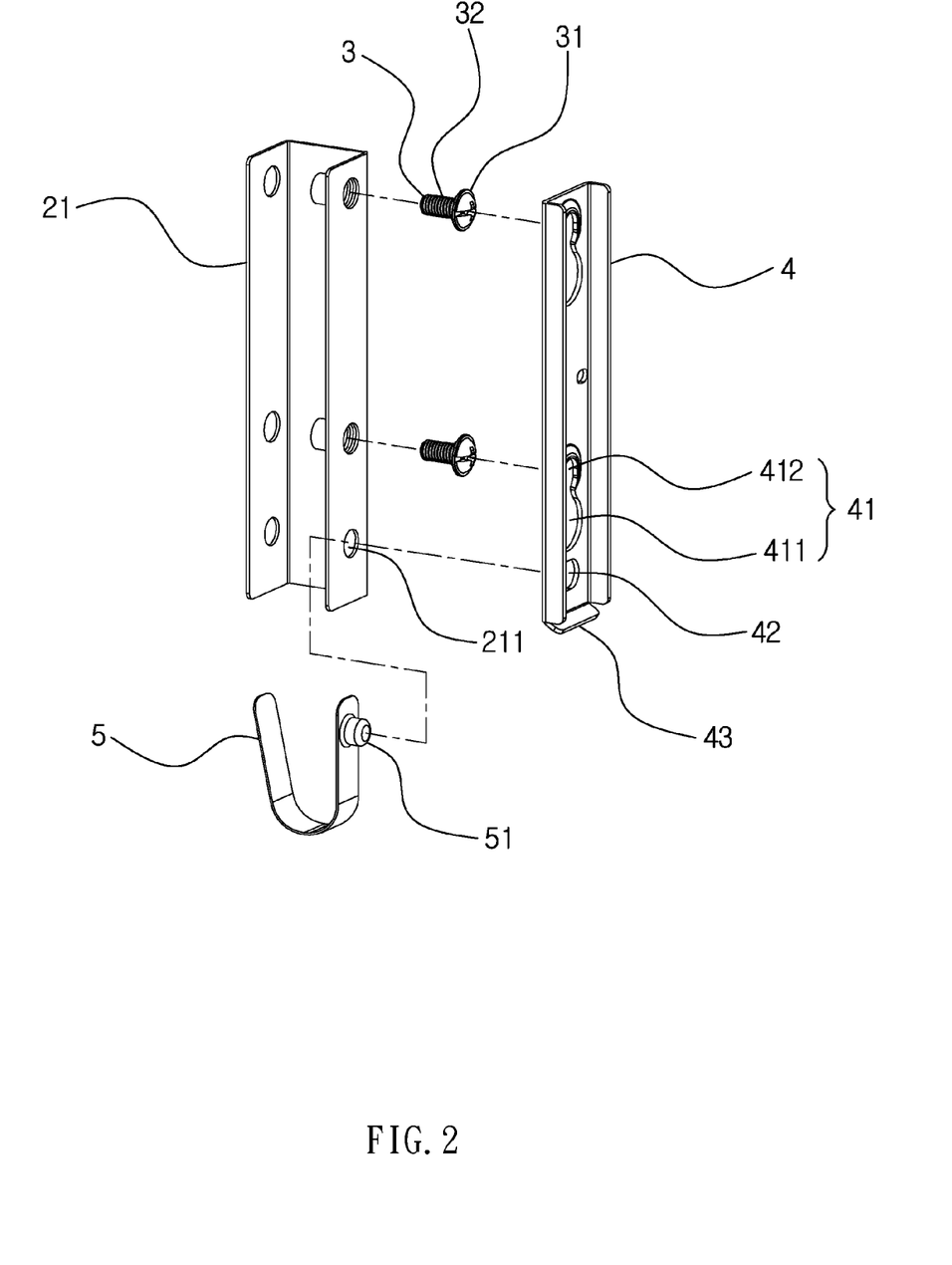
FIG. 2 is a perspective view showing the exploded components of a part of the connecting structure for the barbecue grill according to the preferred embodiment of the present invention.
Figure 3:
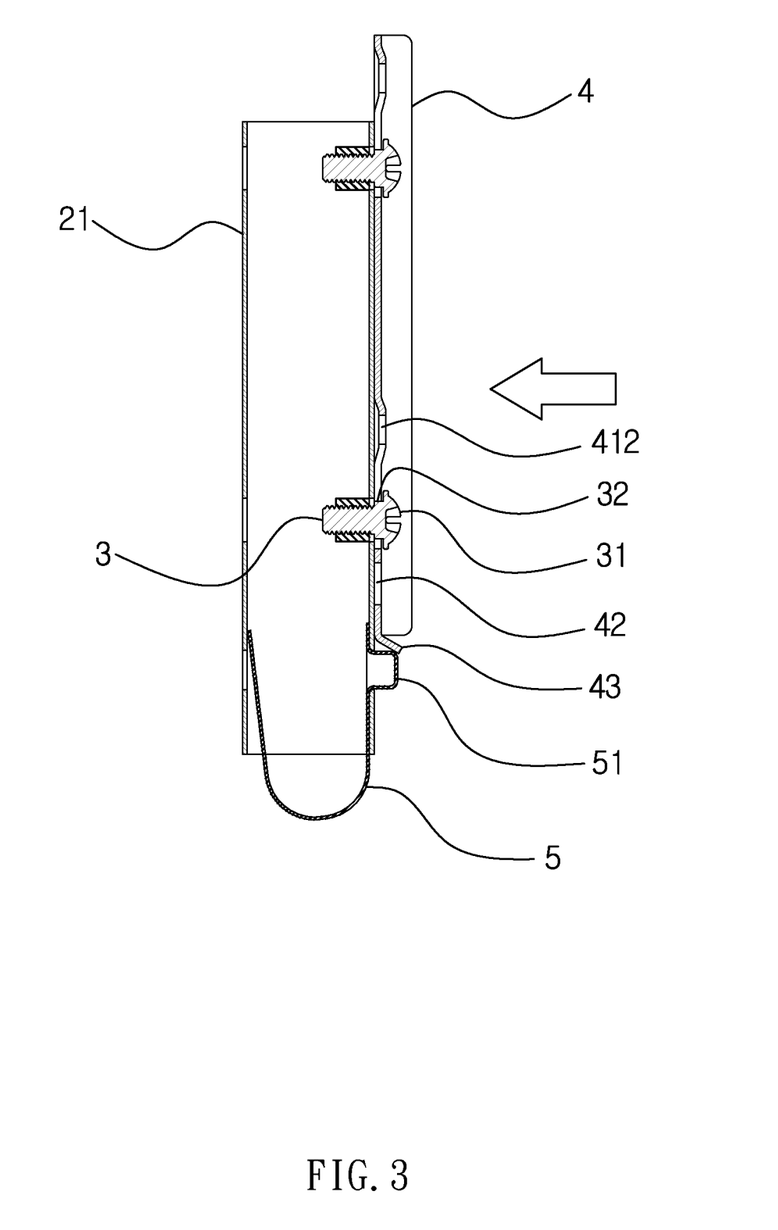
FIG. 3 is a cross sectional view showing the operation of a part of the connecting structure for the barbecue grill according to the preferred embodiment of the present invention.
Figure 4:
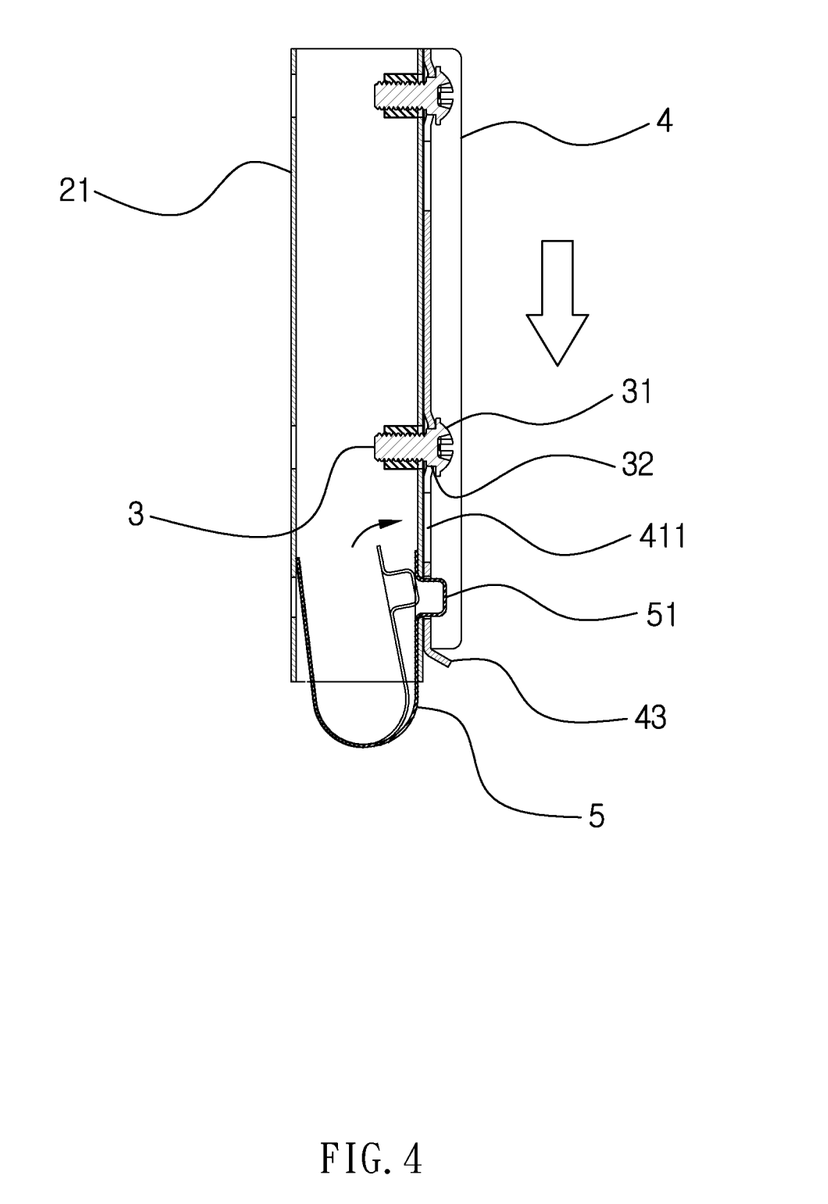
FIG. 4 is another cross sectional view showing the operation of a part of the connecting structure for the barbecue grill according to the preferred embodiment of the present invention.
Figure 5:
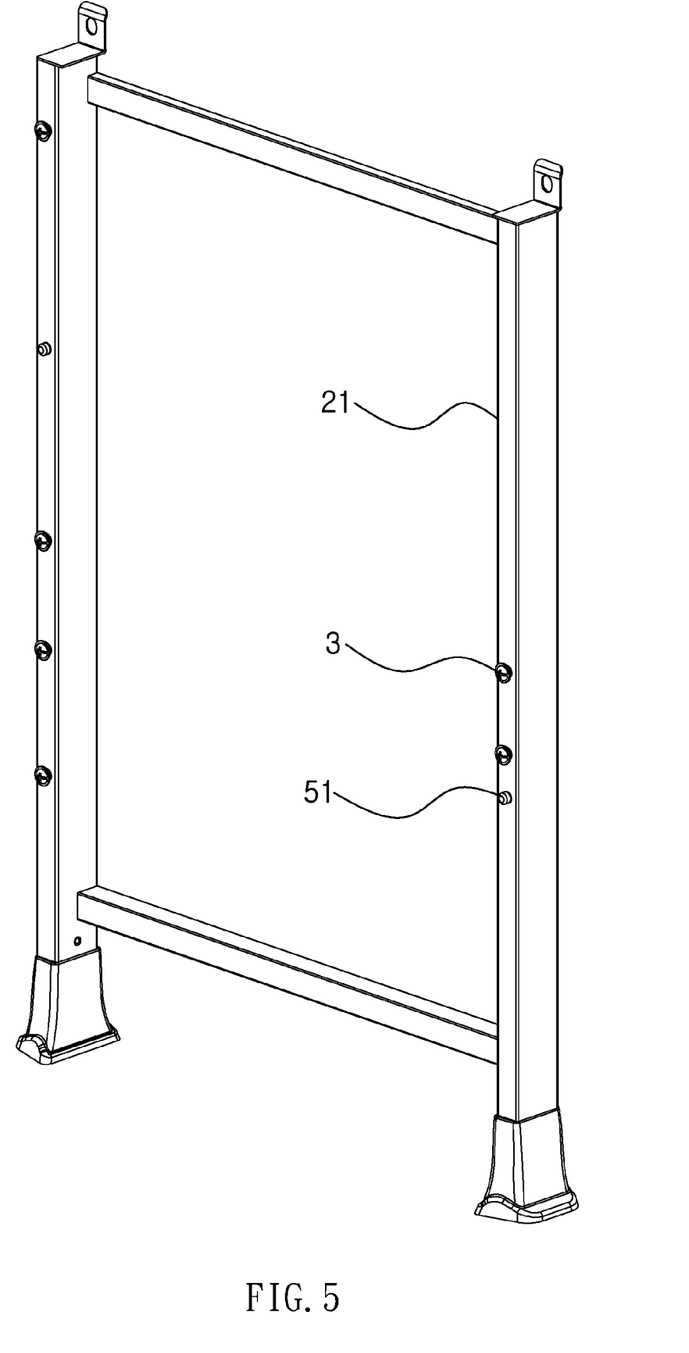
FIG. 5 is a perspective view showing the assembly components of a part of the connecting structure for the barbecue grill according to the preferred embodiment of the present invention.

With reference to FIGS. 2 to 4, the head portion 31 of said each connecting element 3 inserts through the wide section 411 of the connection groove 41, and the extension 32 of said each connecting element 3 is moved to the narrow section 412 of the connection groove 41 so that the head portion 311 retains in the narrow section 412, thus connecting said each positioning piece 4 and said any two connecting elements 3.

Figure 8:
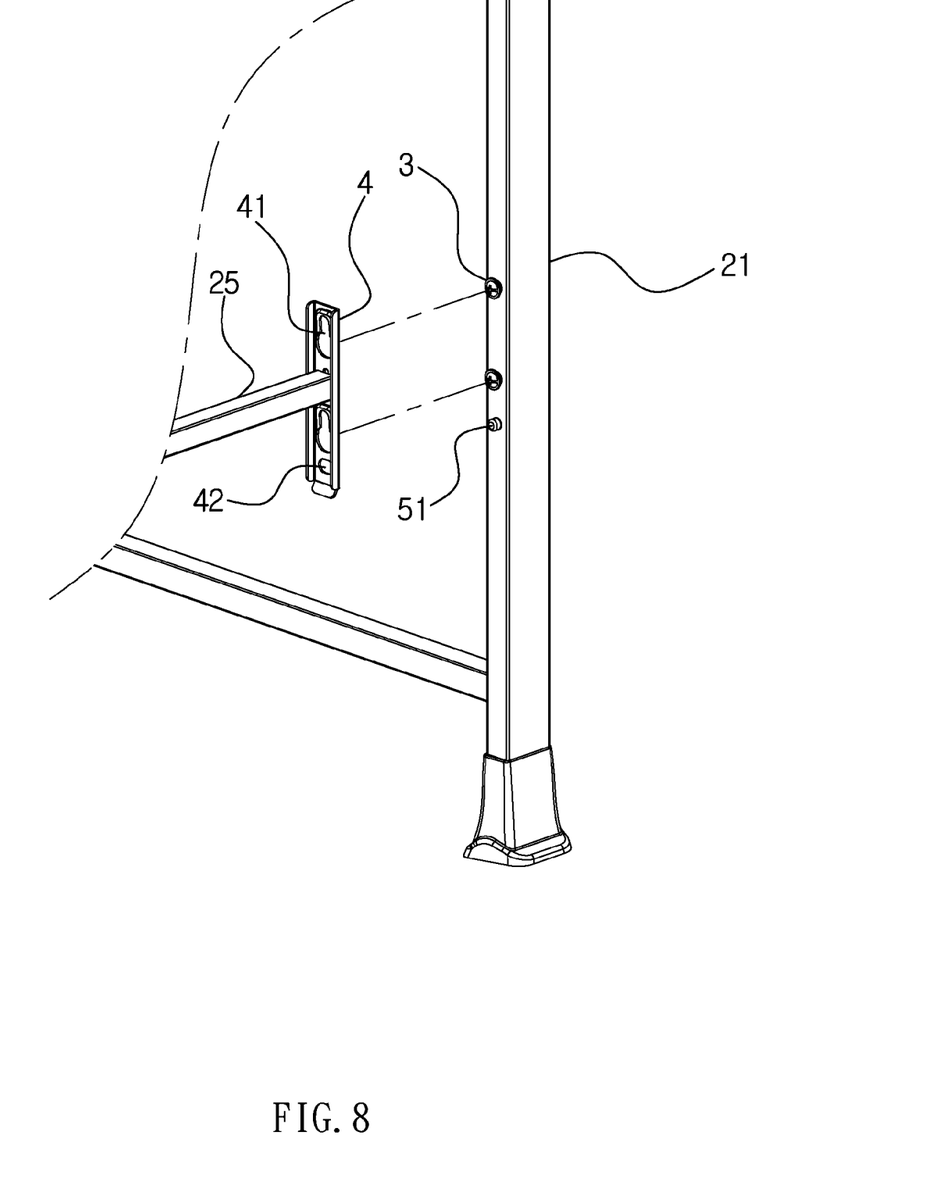
FIGS. 8 to 15 are a perspective view showing the operation of a part of the connecting structure for the barbecue grill according to the preferred embodiment of the present invention.
Figure 9:
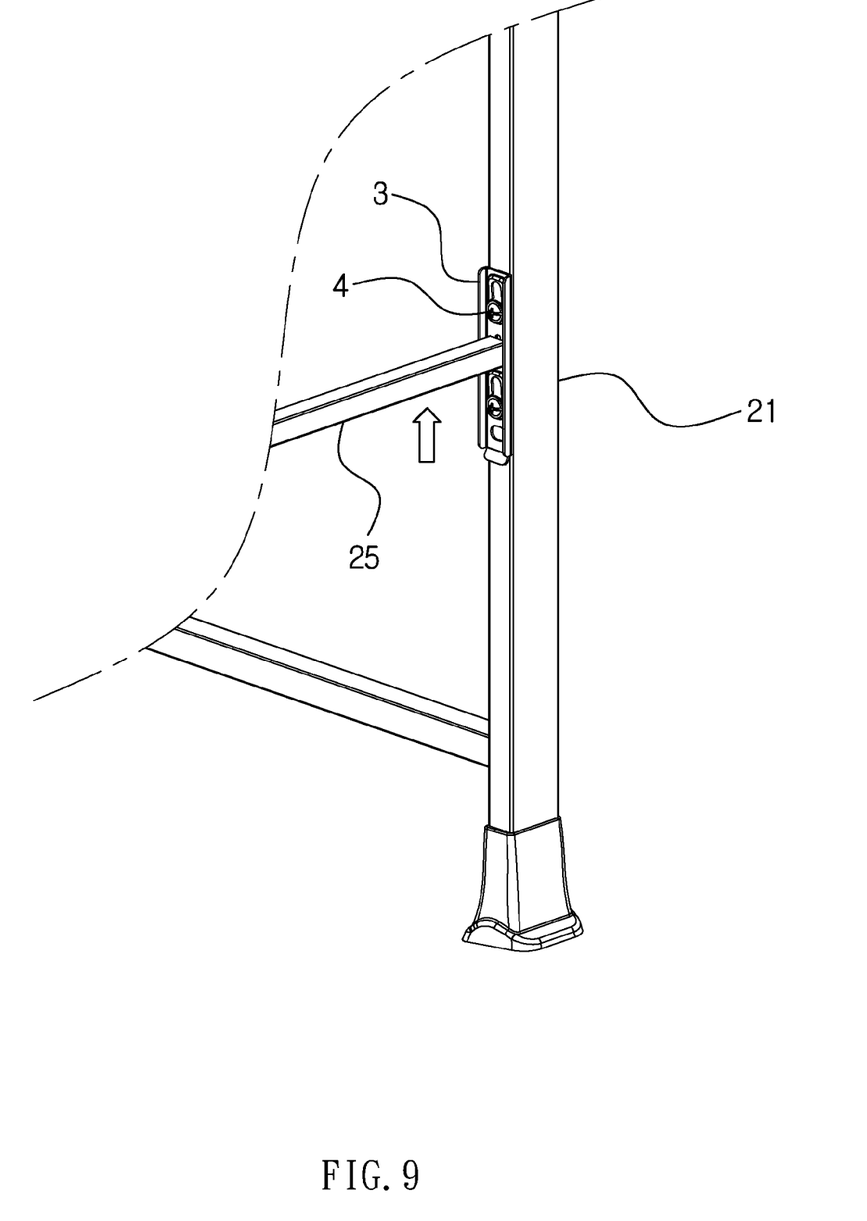
Figure 10:
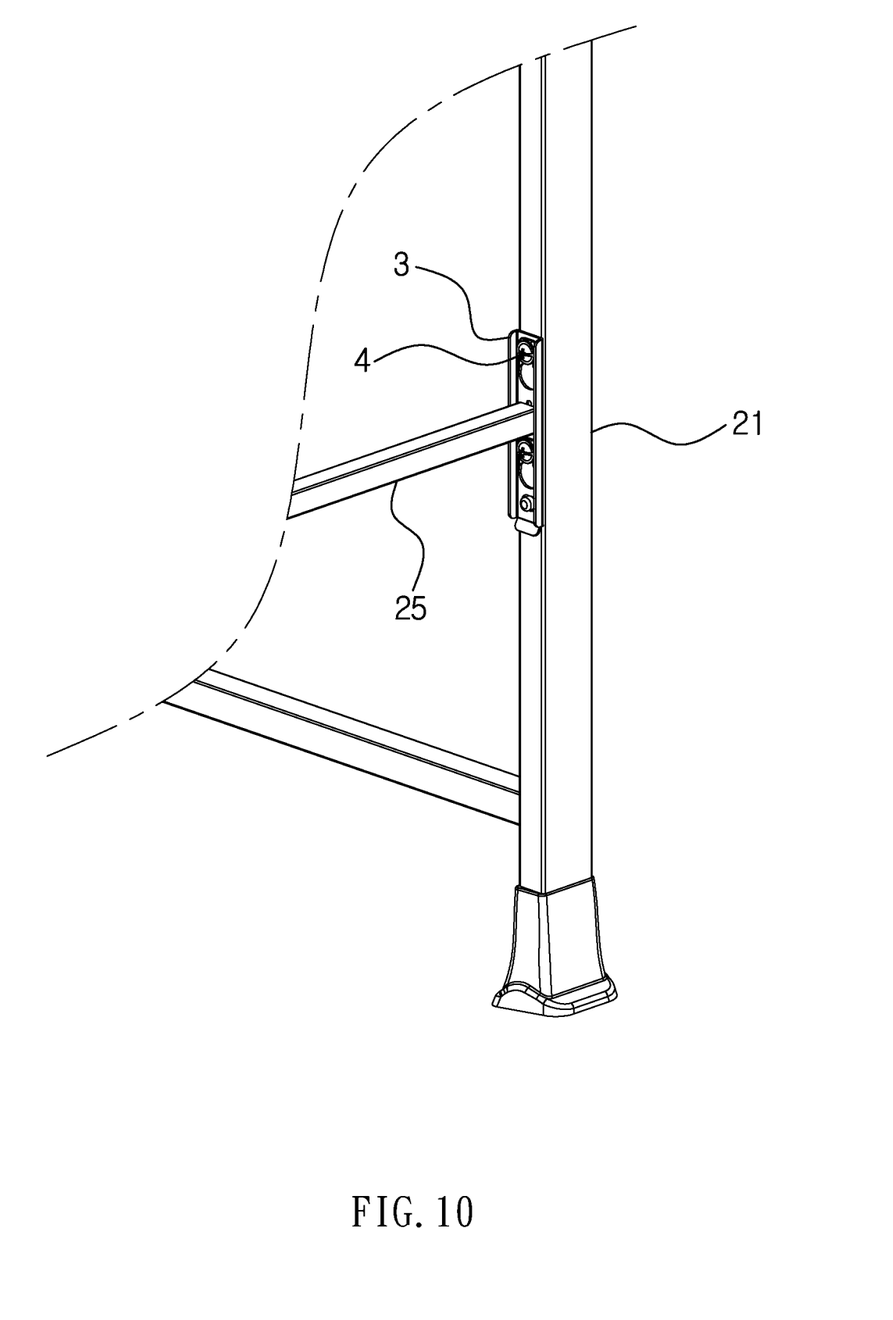
Figure 11:
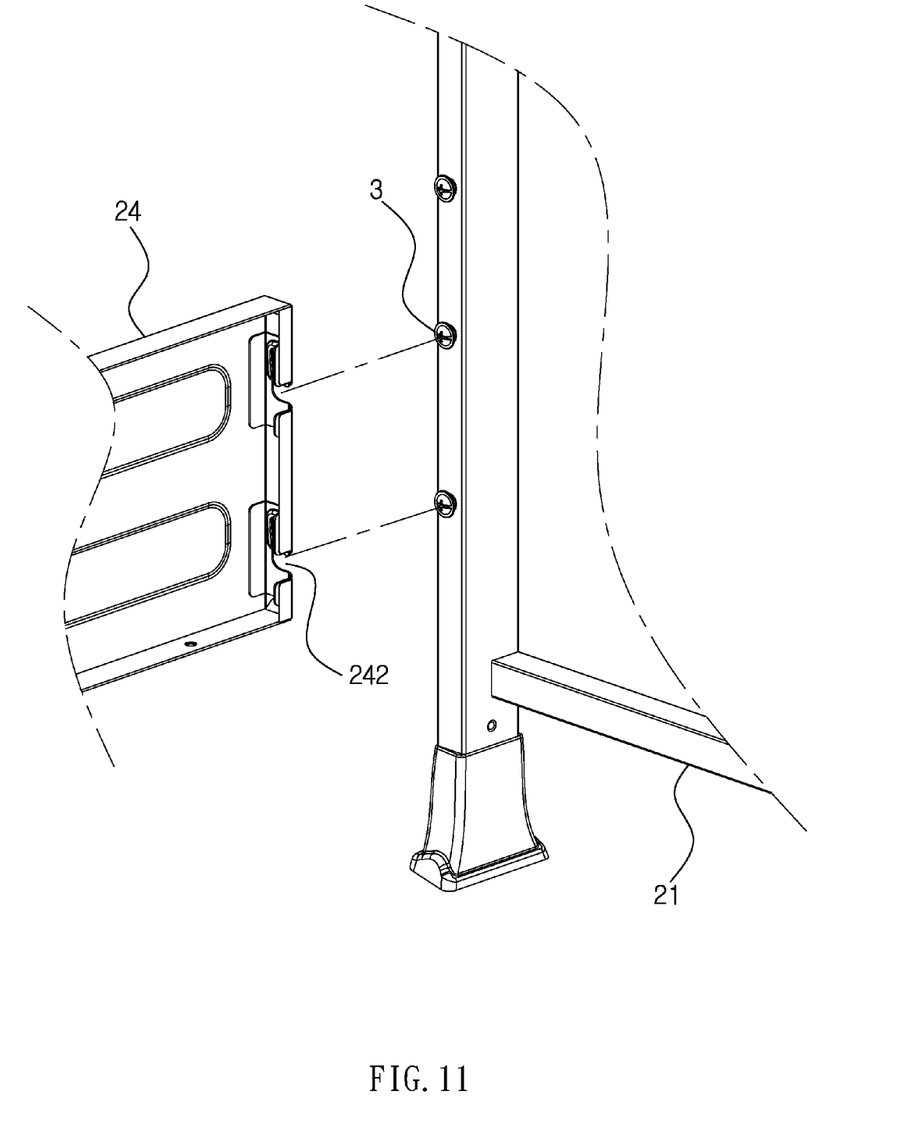
Figure 12:
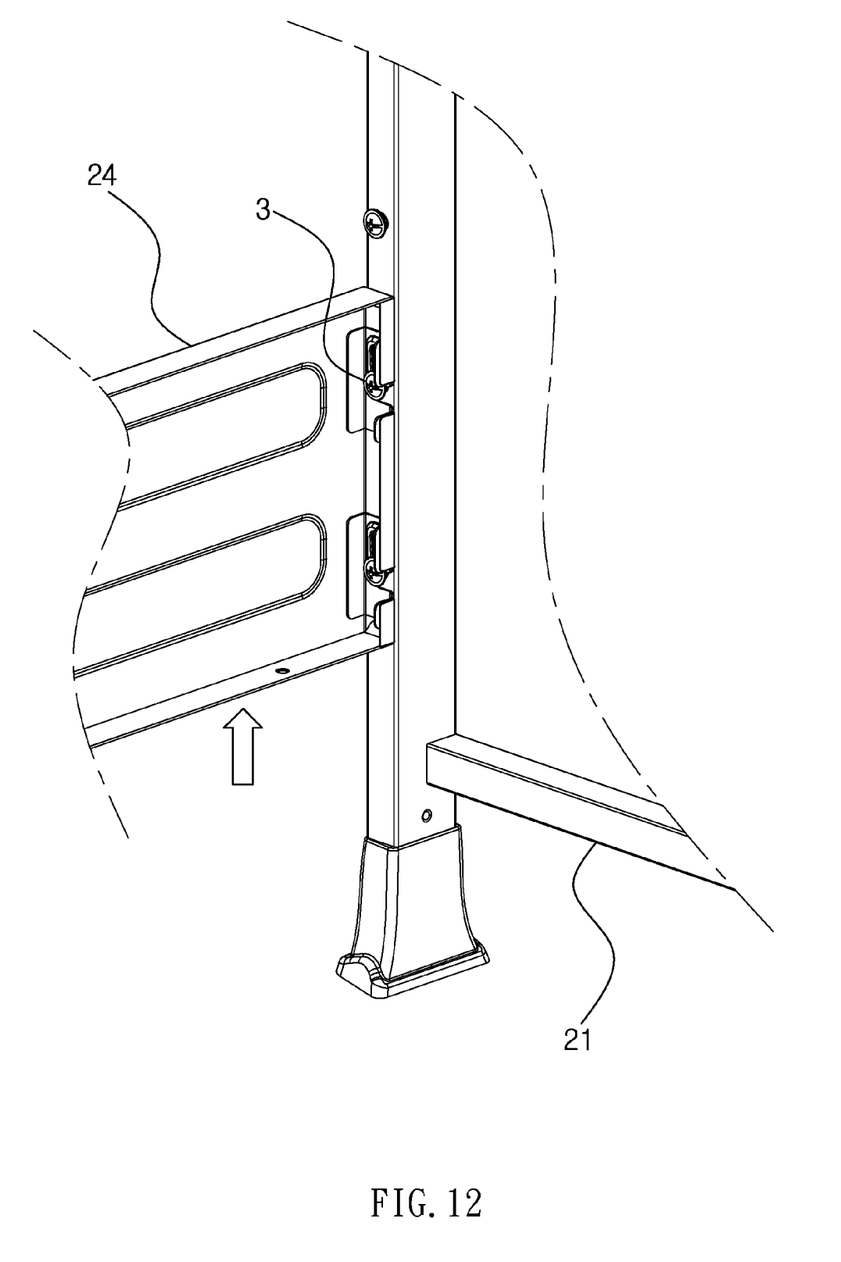
Figure 13:
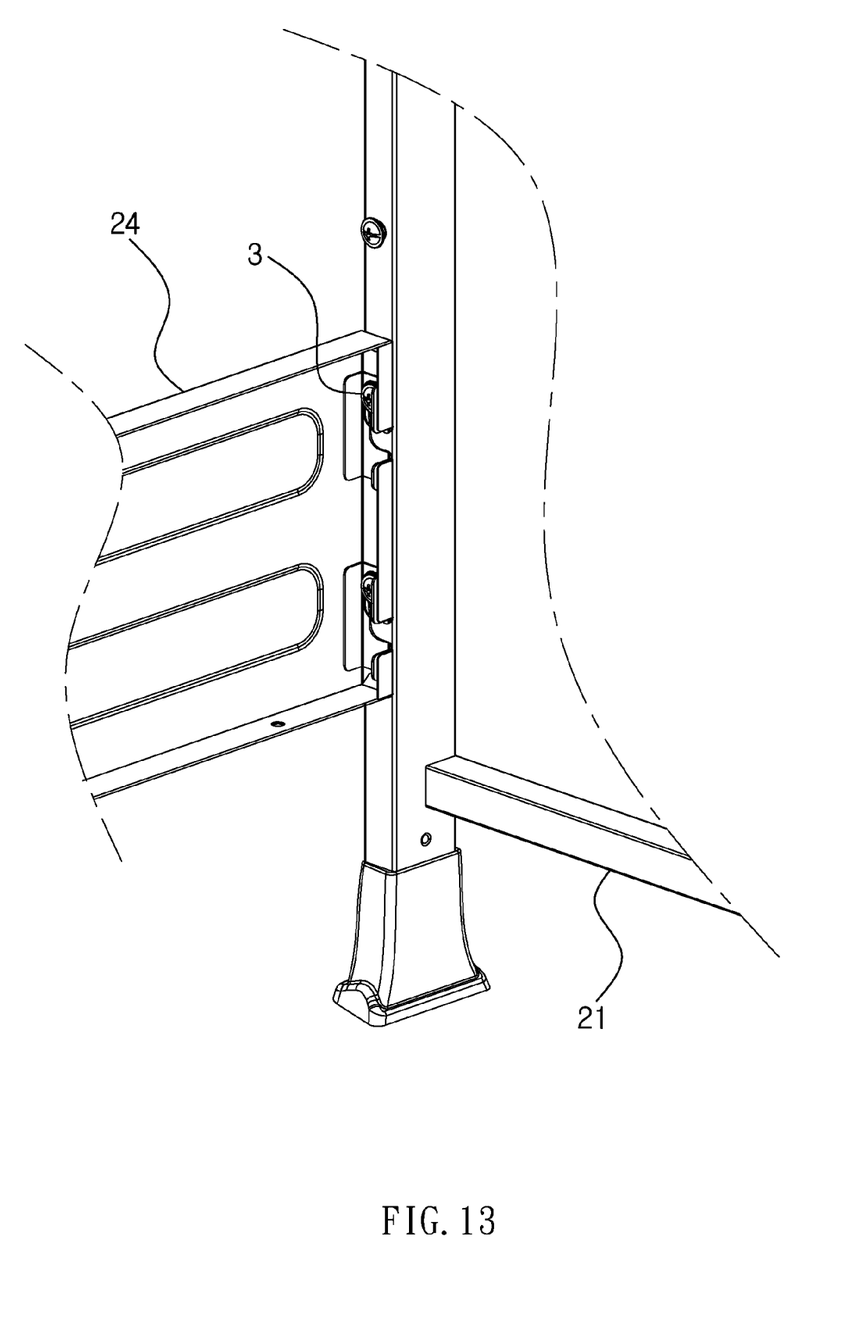
Figure 14:
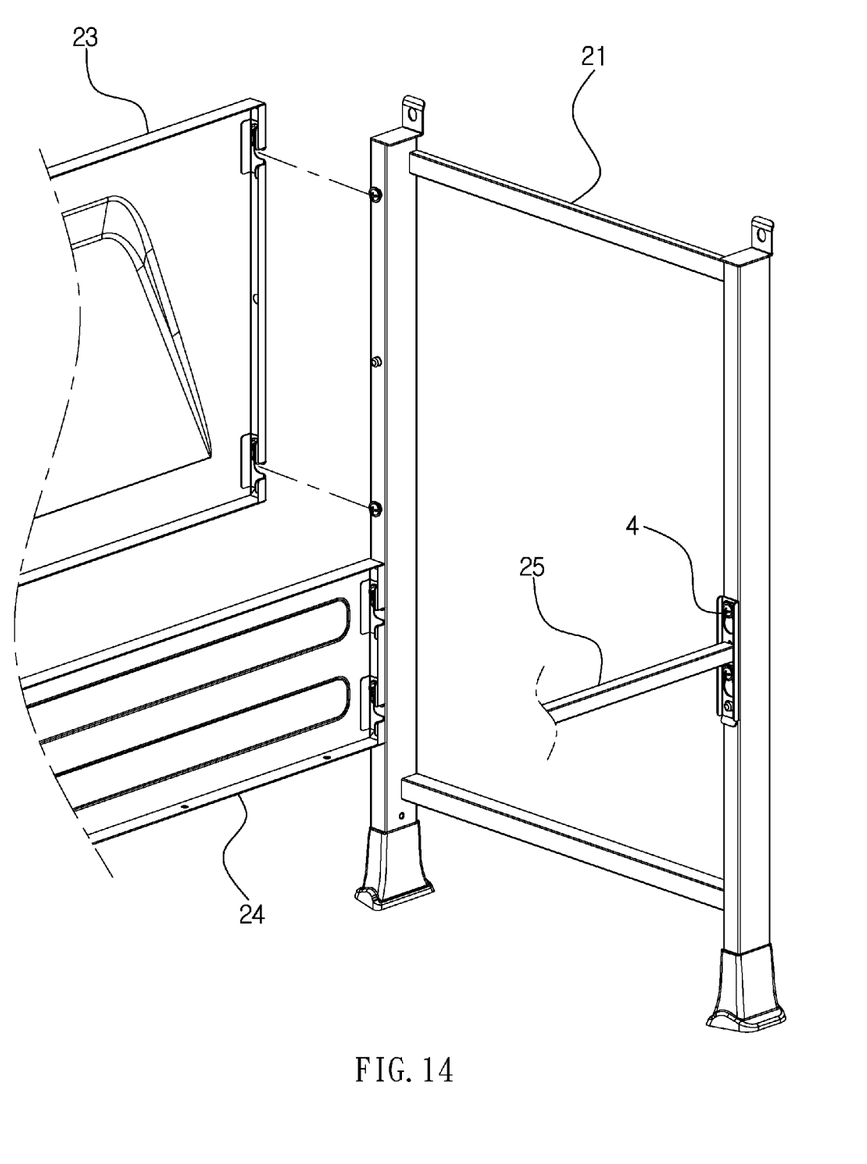
Figure 15:
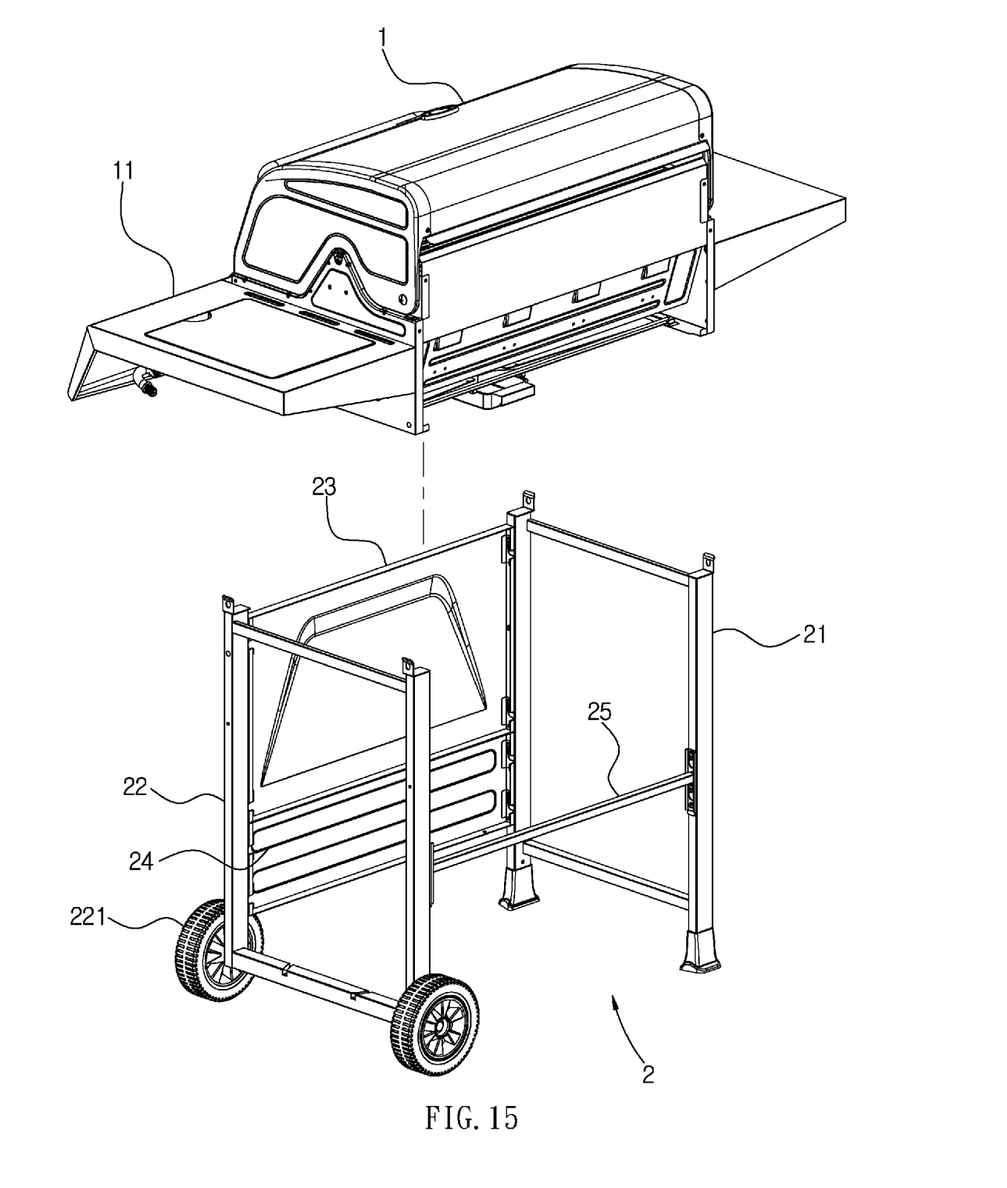
Figure 16:
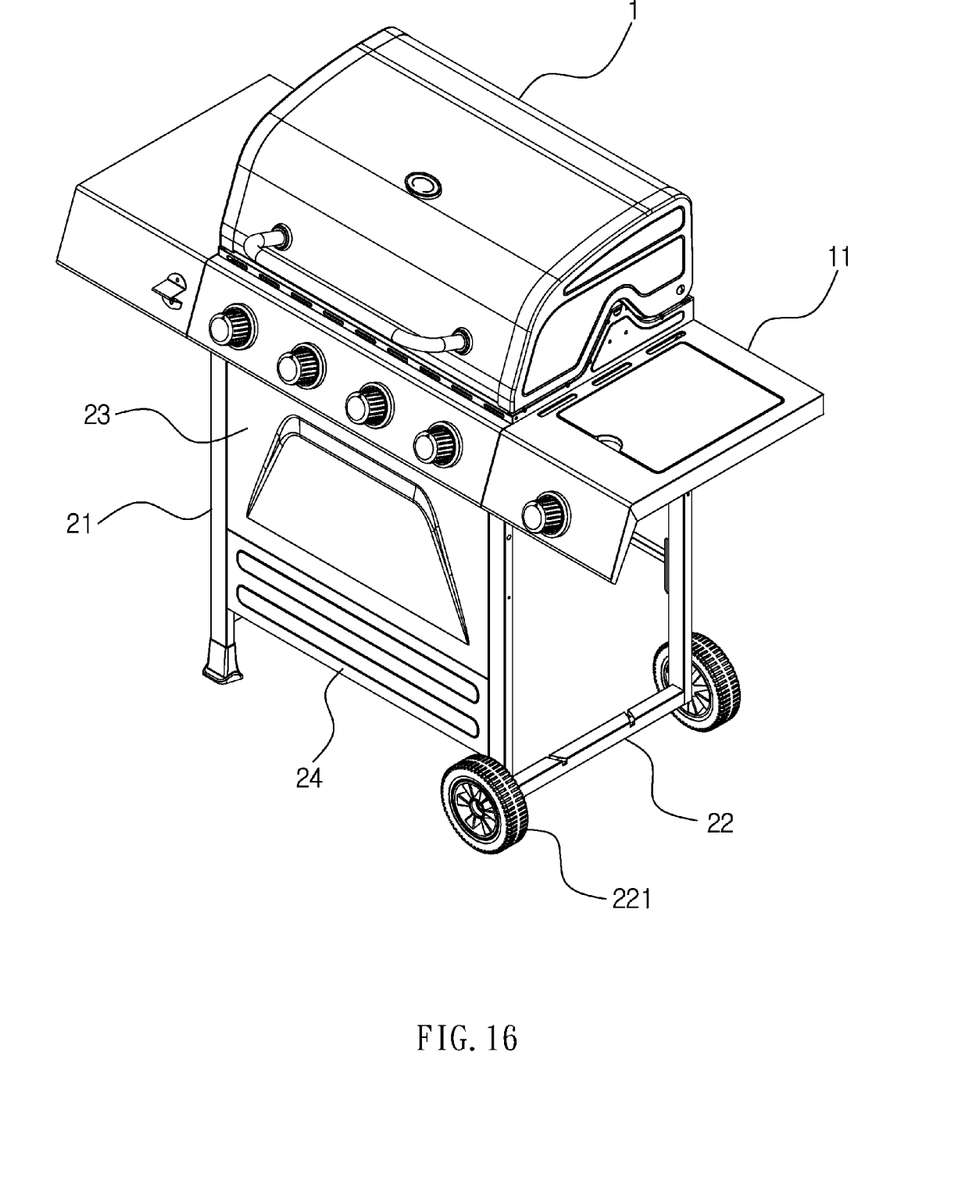
FIG. 16 is a perspective view showing the assembly of the barbecue grill according to the preferred embodiment of the present invention.

Referring further to FIGS. 6 to 16, the two positioning pieces 4 are in connection with the first side plate 21 and the second side plate 22 (as shown in FIGS. 8 to 10), and the fourth side plate 24 is coupled with the first side plate 21 and the second side plate 22 (as illustrated in FIGS. 11 to 13), the third side plate 23 is joined with the first side plate 21 and the second side plate 22 (as shown in FIG. 14), thereafter the body 1 is fixed on the holding mount 2 (as illustrated in FIGS. 15 to 16).

Furthermore, two elastic sheets 5 are connected with the first side plate 21 and the second side plate 22, and each of the first side plate 21 and the second side plate 22 has a through orifice 211 corresponding to each elastic sheet 5 (as illustrated in FIG. 2), said each elastic sheet 5 has a protrusion 51 extending out of the through orifice 211, and said each positioning piece 4 has a first aperture 42 defined thereon so as to correspond to the through orifice 211 and the protrusion 51 of said each elastic sheet 5 (as shown in FIG. 2), and the third side plate 23 has two second apertures 233 formed on the two peripheral sides thereof, respectively, so as to correspond to the protrusion 51 of said each elastic sheet 5 (as illustrated in FIG. 6). With reference to FIGS. 3 and 4, the protrusion 51 of said each elastic sheet 5 retains with each of the two second apertures 233 and the first aperture 42, thus connecting said each positioning piece 4 and the third side plate 23 together securely.

Preferably, said each positioning piece 4 further has a tilted guiding rib 43 arranged on a bottom thereof so as to push the protrusion 51 of said each elastic sheet 5 to retain with the first aperture 42.

The second side plate 22 further has a plurality of rollers 221 fixed on a bottom thereof so as to move the barbecue grill smoothly by way of the plurality of rollers 221.

In addition, the body 1 includes two platforms 11 movably arranged on two sides thereof, and each platform 11 is storable.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A connecting structure for a barbecue grill comprising: a grilling device and a holding mount;
   the holding mount including a first side plate, a second side plate, a third side plate, a fourth side plate, and a pull bar;
   wherein each of the first side plate and the second side plate has a plurality of connecting elements fixed on two peripheral sides of a first surface thereof and on an opposing two peripheral sides of a second surface thereof, respectively;
   each connecting element has a head portion and an extension, a diameter of which is less than the head portion, the third side plate has multiple first retaining slots defined on two peripheral sides thereof, individually, and the fourth side plate has multiple second retaining slots formed on two peripheral sides thereof, individually;
   wherein each first retaining slot has a first notch defined on a bottom thereof so as to retain said each connecting element, and each second retaining slot has a second notch defined on a bottom thereof so as to retain said each connecting element;
   wherein the pull bar has two positioning pieces mounted on two peripheral sides thereof, respectively, and the two positioning pieces correspond to the first side plate and the second side plate, respectively;
   each positioning piece has a connection groove configured to connect with any two of the plurality of connecting elements, and the connection groove has a wide section and a narrow section communicating with the wide section, wherein a diameter of the wide section is greater than the head portion of said each connecting element, and a diameter of the narrow section is within the diameters of the head portion and the extension of said each connecting element.

2. The connecting structure for the barbecue grill as claimed in claim 1, wherein two elastic sheets are connected with the first side plate and the second side plate, each of the first side plate and the second side plate has a through orifice corresponding to each elastic sheet, and said each elastic sheet has a protrusion extending out of the through orifice, wherein said each positioning piece has a first aperture defined thereon so as to correspond to the through orifice and the protrusion of said each elastic sheet.

3. The connecting structure for the barbecue grill as claimed in claim 2, wherein said each positioning piece further has a tilted guiding rib arranged on a bottom thereof so as to push the protrusion of said each elastic sheet to retain with the first aperture.

4. The connecting structure for the barbecue grill as claimed in claim 1, wherein the second side plate further has a plurality of rollers fixed on a bottom thereof.

5. The connecting structure for the barbecue grill as claimed in claim 1, wherein the grilling device includes two platforms movably arranged on two sides thereof.

\* \* \* \* \*